United States Patent
Wang et al.

(10) Patent No.: US 10,095,033 B2
(45) Date of Patent: Oct. 9, 2018

(54) MULTIMODAL INTERACTION WITH NEAR-TO-EYE DISPLAY

(75) Inventors: Kongqiao Wang, Helsinki (FI); Vuokko Lantz, Vantaa (FI); Jiangwei Li, Beijing (CN); Lei Xu, Beijing (CN); Jyri Huopaniemi, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 45 days.

(21) Appl. No.: 14/412,357

(22) PCT Filed: Jul. 27, 2012

(86) PCT No.: PCT/CN2012/079286
§ 371 (c)(1),
(2), (4) Date: Mar. 16, 2015

(87) PCT Pub. No.: WO2014/015521
PCT Pub. Date: Jan. 30, 2014

(65) Prior Publication Data
US 2015/0338651 A1    Nov. 26, 2015

(51) Int. Cl.
*G09G 5/00* (2006.01)
*G06F 3/033* (2013.01)
(Continued)

(52) U.S. Cl.
CPC ......... *G02B 27/0172* (2013.01); *G06F 1/163* (2013.01); *G06F 3/011* (2013.01);
(Continued)

(58) Field of Classification Search
CPC .................. G06F 3/013; G02B 27/017; G02B 2027/0178
See application file for complete search history.

(56) References Cited

U.S. PATENT DOCUMENTS

| | | | |
|---|---|---|---|
| 6,111,580 A | 8/2000 | Kazama et al. | |
| 6,771,294 B1 * | 8/2004 | Pulli | G06F 3/011 345/173 |
| 8,223,088 B1 | 7/2012 | Gomez et al. | |

(Continued)

FOREIGN PATENT DOCUMENTS

| | | |
|---|---|---|
| CN | 1770063 A | 5/2006 |
| EP | 1643401 A1 | 4/2006 |

(Continued)

OTHER PUBLICATIONS

International Search Report and Written Opinion received for corresponding Patent Cooperation Treaty Application No. PCT/CN2012/079286, dated May 9, 2013, 10 pages.

(Continued)

Primary Examiner — Nan-Ying Yang
(74) Attorney, Agent, or Firm — Alston & Bird LLP

(57) ABSTRACT

The invention relates to a method, comprising tracking the gaze of an eye of a user by a first camera, wherein a position of the gaze determines a place for the cursor on the screen of a near-to-eye display (NED), wherein the movement of the gaze is configured to move the cursor on the screen and when the movement of the gaze is detected to be still or moving only slightly; observing a gesture of one hand of the user by a second camera, and executing a further operation if at least one gesture of the hand is detected. The invention further relates to an apparatus and a computer program product configured to perform the method.

18 Claims, 5 Drawing Sheets

(51) Int. Cl.
*G09G 5/08* (2006.01)
*G02B 27/01* (2006.01)
*G06F 3/0481* (2013.01)
*G06F 1/16* (2006.01)
*G06F 3/01* (2006.01)

(52) U.S. Cl.
CPC .......... *G06F 3/013* (2013.01); *G06F 3/04812* (2013.01); *G06F 3/04817* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 2006/0082542 A1 | 4/2006 | Morita et al. |
| 2006/0109237 A1 | 5/2006 | Morita et al. |
| 2010/0110368 A1 | 5/2010 | Chaum |
| 2011/0001699 A1 | 1/2011 | Jacobsen et al. |
| 2011/0077548 A1 | 3/2011 | Torch |
| 2011/0213664 A1 | 9/2011 | Osterhout et al. |
| 2011/0214082 A1* | 9/2011 | Osterhout ............ G02B 27/017 715/773 |
| 2012/0035934 A1* | 2/2012 | Cunningham ........ G06F 1/1639 704/260 |
| 2012/0075168 A1* | 3/2012 | Osterhout ............ G02B 27/017 345/8 |
| 2012/0188148 A1* | 7/2012 | DeJong .............. G02B 27/0093 345/8 |
| 2013/0050258 A1* | 2/2013 | Liu ...................... G06T 19/006 345/633 |

FOREIGN PATENT DOCUMENTS

| | | |
|---|---|---|
| WO | 2011/156195 A2 | 12/2011 |
| WO | 2012082971 A1 | 6/2012 |

OTHER PUBLICATIONS

"Google Testing Heads-Up Display Glasses in Public, Won't Make You Look Like Robocop", Engadget, Retrieved on Jan. 14, 2016, Webpage available at : http://www.engadget.com/2012/04/04/google-testing-heads-up-display-glasses-in-public-wont-make-yo/.

Pylvanainen et al., "Gaze Tracking for Near to Eye Displays", 18th International Conference on Artificial Reality and Telexistence, Dec. 1-3, 2008, pp. 5-11.

Salvucci et al., "Intelligent Gaze-Added Interfaces", Proceedings of the SIGCHI conference on Human Factors in Computing Systems, vol. 2, No. 1, Apr. 1-6, 2000, pp. 273-280.

Yamato et al., "Button Selection for General GUIs Using Eye and Hand Together", Proceedings of the working conference on Advanced visual interfaces, 2000, pp. 270-273.

Zhai et al., "Manual and Gaze Input Cascaded (MAGIC) Pointing", Proceedings of the SIGCHI conference on Human Factors in Computing Systems, May 15-20, 1999, pp. 246-253.

Heo et al., "A Realistic Game System Using Multi-Modal User Interfaces", IEEE Transactions on Consumer Electronics, vol. 56, No. 3, Aug. 2010, pp. 1364-1372.

"Augmented Reality Supported Adaptive and Personalized Experience in a Museum Based on Processing Real-Time Sensor Events—ARtSENSE—", Danub.IT, Retrieved on Jan. 27, 2016, Webpage available at : http://www.google.com/url?sa=t&rct=j&q=%22near%20to%20eye%22%20%22gaze%20tracking%22%20%22hand%20gesture%22&source=web&cd=1&sqi=2&ved=0CDcQFjAA&url=http%3A%2F%2Fwww.cimgrupa.eu%2Fsr%2Fdownload%2FDanub.IT%2520-%2520ARtSENSE.

Reale et al., "A Multi-Gesture Interaction System Using a 3-D Iris Disk Model for Gaze Estimation and an Active Appearance Model for 3-D Hand Pointing", IEEE Transactions on Multimedia, vol. 13, No. 3, Jun. 2011, pp. 474-486.

Extended European Search Report received for corresponding European Patent Application No. 12881628.7, dated Dec. 23, 2015, 9 pages.

Office Action for Chinese Application No. 201280074696.1 dated Jun. 19, 2017, 9 pages.

Office Action for European Application No. 12881628.7 dated Mar. 20, 2018, 10 pages.

Office action received for corresponding Chinese Patent Application No. 201280074696.1, dated Jun. 28, 2016, 7 pages of office action and 4 pages of Translation available.

* cited by examiner

MULTIMODAL INTERACTION WITH NEAR-TO-EYE DISPLAY

RELATED APPLICATION

This application was originally filed as Patent Cooperation Treaty Application No. PCT/CN2012/079286 filed July 27, 2012.

FIELD OF THE INVENTION

The present application relates generally to a multimodal interaction system for a near-to-eye display with the combination of a hand gesture detector and a gaze tracker.

BACKGROUND

Head-worn display i.e. near-to-eye display devices, particularly mobile device eyewear, enable an individual to see natural or electronically produced images while simultaneously allowing the individual to see the real world through the display. In addition, head-worn display devices may comprise technology allowing the individual to interact with the display device, i.e. to control the device. Existing control mechanisms may comprise, for example, motion sensors, gaze tracking systems or touch sensors. However, existing control mechanisms are often difficult, inconvenient or hard to use.

SUMMARY

Now, an improved method and technical equipment implementing the method have been invented. Various aspects of the invention include a method, an apparatus and a computer program, which are characterized by what is stated in the independent claims. Various aspects of examples of the invention are set out in the claims.

According to a first aspect, a method is provided, comprising tracking the gaze of an eye of a user by a first camera, wherein a position of the gaze determines a place for the cursor on the screen of a near-to-eye display (NED), wherein the movement of the gaze is configured to move the cursor on the screen and when the movement of the gaze is detected to be still or moving only slightly, observing a gesture of one hand of the user by a second camera, and executing a further operation if at least one gesture of the hand is detected.

According to an embodiment, the further operation depends on the detected gesture. According to an embodiment, the detected gesture is a movement of a fist, shaking of a palm or movement of a palm from or to the second camera. According to an embodiment, the further operation further depends on the position of the cursor on the screen of the near-to-eye display. According to an embodiment, the further operation is adjusting the position of the cursor on the screen of the near-to-eye display on the basis of the relative movement of the hand if the cursor is outside the area of a menu option or a functional icon displayed on the screen. According to an embodiment, the further operation is selecting a menu option or a functional icon displayed on the screen of the near-to-eye display if the cursor is on the menu option or functional icon. According to an embodiment, the further operation is zooming in or out the view of the screen of the near-to-eye display. According to an embodiment, the further operation is returning, removing or deleting. According to an embodiment, the method further comprises observing blinking of the eye of the user if no gesture of the hand is detected and if the cursor is on the area of a menu option or a functional icon displayed on the screen, and selecting the menu option or the functional icon if blinking of the eye of the user is detected.

According to a second aspect, an apparatus is provided, comprising at least one processor, at least one memory including a computer program code for one or more program units, said at least one memory and the computer program code being configured, with the processor, to cause the apparatus to perform at least the following: tracking of the gaze of one eye of a user by a first camera, wherein a position of the gaze determines a place for the cursor on a screen of a near-to-eye display (NED) of the apparatus, wherein a movement of the gaze is configured to move the cursor on the screen and when the movement of the gaze is detected to be still or moving only slightly, observing a gesture of one hand of the user by a second camera, and executing a further operation if at least one gesture of the hand is detected.

According to an embodiment, the further operation depends on the detected gesture. According to an embodiment, the detected gesture may be the movement of a fist, the shaking of a palm and the movement of a palm from or to the second camera. According to an embodiment, the further operation further depends on the position of the cursor on the screen of the near-to-eye display. According to an embodiment, further operation is adjusting the position of the cursor on the screen of the near-to-eye display on the basis of the relative movement of the hand if the cursor is outside the area of a menu option or a functional icon displayed on the screen. According to an embodiment, further operation is selecting a menu option or a functional icon displayed on the screen of the near-to-eye display if the cursor is on the menu option or functional icon. According to an embodiment, further operation is zooming in or out the view of the screen of the near-to-eye display. According to an embodiment, the further operation is returning, removing or deleting. According to an embodiment, the computer program code is further configured, with the processor, to cause the apparatus to perform observing blinking of the eye of the user if no gesture of the hand is detected and if the cursor is on the area of a menu option or a functional icon displayed on the screen, and selecting the menu option or functional icon of the cursor on the screen of the near-to-eye display if blinking of the eye of the user is detected. According to an embodiment, said apparatus is a near-to-eye display (NED) device. According to an embodiment, said near-to-eye display device is a mobile phone. According to an embodiment, the near-to-eye display device is a terminal device for a mobile phone.

According to an embodiment, a computer program product including one or more sequences of one or more instructions which, when executed by one or more processors, cause an apparatus to perform at least the following: tracking the gaze of an eye of a user by a first camera, wherein a position of the gaze determines a place for the cursor on a screen of a near-to-eye display (NED), wherein movement of the gaze is configured to move the cursor on the screen and when the movement of the gaze is detected to be still or moving only slightly, observing a gesture of one hand of the user by a second camera, and executing a further operation if at least one gesture of the hand is detected.

According to an embodiment, the further operation depends on the detected gesture. According to an embodiment, the detected gesture may be the movement of a fist, the shaking of a palm or the movement of a palm from or to the second camera. According to an embodiment, the further operation further depends on the position of the cursor on the screen of the near-to-eye display. According to an embodiment, the further operation is adjusting the position of the cursor on the screen of the near-to-eye display on the basis of the relative movement of the hand if the cursor is outside the area of a menu option or a functional icon displayed on the screen. According to an embodiment, the further operation is selecting a menu option or a functional icon displayed on the screen of the near-to-eye display if the cursor is on the menu option or functional icon. According to an embodiment, the further operation is zooming in or out the view of the screen of the near-to-eye display. According to an embodiment, the further operation is returning, removing or deleting. According to an embodiment, the computer program code is further configured, with the processor, to cause the apparatus to perform observing blinking of the eye of the user if no gesture of the hand is detected and if the cursor is on the area of a menu option or a functional icon displayed on the screen, and selecting the menu option or the functional icon if blinking of the eye of the user is detected. According to an embodiment, the apparatus is a near-to-eye display (NED) device. According to an embodiment, the near-to-eye display device is a mobile phone. According to an embodiment, the near-to-eye display device is a terminal device for a mobile phone.

According to a third aspect, a computer program is provided, comprising one or more instructions which, when executed by one or more processors, cause an apparatus to perform:

According to an embodiment, an apparatus, comprising tracking the gaze of one eye of a user by a first camera, wherein a position of the gaze determines a place for the cursor on a screen of a near-to-eye display (NED), wherein the movement of the gaze is configured to move the cursor on the screen and when the movement of the gaze is detected to be still or moving only slightly, observing the gesture of one hand of the user by a second camera, and executing a further operation if at least one gesture of the hand is detected.

DESCRIPTION OF THE DRAWINGS

For more complete understanding of example embodiments of the present invention, reference is now made to the following description taken in connection with the accompanying drawings in which.

DETAILED DESCRIPTION OF THE EMBODIMENTS

Figure 1:
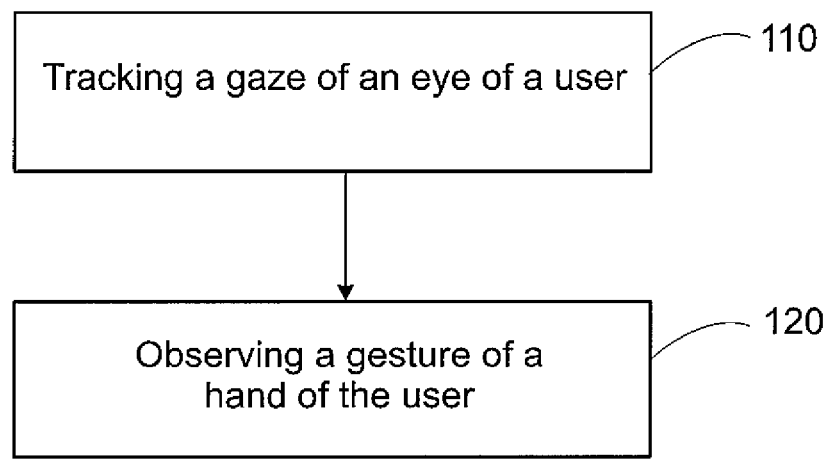
FIG. 1 shows a flow chart of a method for interacting with a near-to-eye display device according to an embodiment.

A near-to-eye display (NED) device control system for implementing embodiments of the invention may comprise at least two heterogeneous cameras. The first camera may be an inside-looking infrared video camera that may track the gaze of one eye of a user of the NED. A cursor is arranged at the view point of the eye on a see-through screen, wherein the screen is at least part of at least one lens of the NED. On the base of a position and/or movement of the eye and the view point, the cursor positions and moves simultaneously on the see-through screen; in other words, the positioning and the movement of the cursor can be controlled by gaze tracking. When the view point (gaze) is detected to be moving, the cursor follows the view point.

When the view point (gaze) is moving slow enough i.e. the gaze movement is so slow that the cursor moves only slightly or the gaze is substantially motionless, the second camera may be activated. The second camera may be any video camera that may be trained on a hand of the user; in other words, the second camera may be a so called side down-looking camera observing gestures of the hand. When at least one gesture is detected by the second camera after activation, the second camera may inform the user interface (UI) software that a hand gesture has been detected and hand gesture control will be activated. Thus, when the second camera detects the hand, the manual control takes over the gaze control. And on the other hand, when the hand disappears from the view of the second camera, the gaze reassumes the control of the UI.

The UI software generates a command for a processor on the basis of the detected hand gesture. The type of the command may depend on the gesture but also on the position of the cursor on the screen. If the cursor is outside the area of a menu option, a functional icon or any other selectable point displayed on the screen, the control system may use the hand gesture detector to adjust the cursor position, for example, onto the functional icon, through computation of hand palm movement. Thus, the cursor may be repositioned on the basis of the hand movement.

However, if the cursor is overlaid on the functional icon, the menu option or any other selectable point when a hand gesture is detected by the hand gesture detector, the gesture can be used for selecting or confirming the menu option or any other selectable point. For example, if a hand grabbing gesture is detected, a selection or a confirmation command to select the icon on which the cursor was overlaid can be made. However, if any hand gesture is not detected by the hand gesture detector and the cursor is overlaid on the functional icon, the menu option or any other selectable point, it is also possible to use the first camera, the gaze tracker, for the selection or confirmation command. Then a blink of an eye when exceeding a certain threshold time (the eye should be closed long enough) or a certain movement of an eye detected by the gaze tracker as well as head gestures, such as nods of a user detected by an acceleration sensor and teeth biting detected by a microphone or EMG sensor, can be used for the selection or confirmation command. Also, spoken commands may be utilized for selection or confirmation.

In addition, by other hand gestures than grabbing, it is possible to create any type of commands for UI control. Those commands may be any type of commands used in regular user interfaces, for example deletion, dragging or cancellation commands. The types of the gestures representing the commands are not restricted in any way, for example it is possible that a hand grasping gesture means zooming instead of selection or confirmation, etc.

An example embodiment of the present invention and its potential advantages are understood by referring to FIGS. 1 through 5 of the drawings.

FIG. 1 shows a flow chart of a method for interacting with a near-to-eye display device according to an embodiment. In step 110, the gaze tracker i.e. a first camera, an infrared camera, of a near-to-eye display (NED) device suitable for creating video streams tracks gaze of a user of the NED device. The position of the gaze determines the place for the cursor on the screen of the near-to-eye display; in other words, the cursor is arranged at the view point of the eye on the see-through screen of the NED. A movement of the gaze and view point moves the cursor on the screen. In step 120, a hand gesture detector observes the gesture or gestures of a hand of the user after the gaze tracker has observed that the gaze stays still or moves only slightly, wherein the hand gesture detector may be a second camera of the NED device, for example a camera suitable for generating video streams of the hand of the user. When at least one gesture is detected by the second camera, the second camera may inform the user interface (UI) software that a hand gesture has been detected and hand gesture control will be activated and the manual control takes over the gaze control. On the basis of detections by the hand gesture detector, the device may continue with further method steps.

Figure 2:
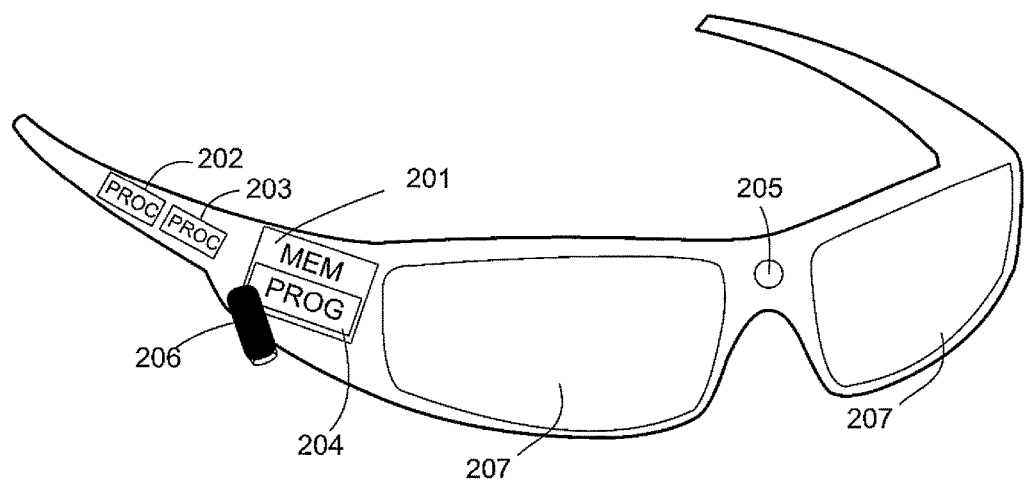
FIG. 2 shows a suitable apparatus for implementing embodiments of the invention.

FIG. 2 shows a suitable apparatus for implementing embodiments of the invention. The apparatus 200 may for example be a terminal device i.e. a near-to-eye display (NED) for a mobile device or a NED device acting as a mobile phone or a smart phone. As shown in FIG. 2, the apparatus 200 contains a memory 201, at least one processor 202 and 203, and a computer program code 204 residing in the memory 201 for implementing, for example, the functionalities of a software application, such as the user interface of an operating system or a browser. The apparatus 200 comprises at least two cameras 205 and 206 for capturing image data, for example, video streams. The camera 205 may be inside-looking, i.e. an infrared camera looking towards the user of the device and arranged for gaze tracking. The camera 206 may be side down-looking, trained on one hand of the user and arranged for hand gesture tracking. The apparatus 200 may also comprise a screen i.e. a display 207, for example a see-through screen, for viewing a graphical user interface. The lenses of the ear-to-eye device 200 may act as see-through screens. It is also possible that only part of one lens is used as a screen or that only one lens is used as a screen. The apparatus 200 may also contain one or more wireless or wired microphones or any suitable audio input which may be digital or analogue signal input attached thereto. In addition, the apparatus 200 may also comprise a rechargeable battery (not shown) or another suitable mobile energy device, such as a solar cell, fuel cell or clockwork generator. The apparatus 200 may further comprise an infrared port for short range line of sight communication to other devices. The infrared port may be used for obtaining i.e. receiving media content to be tagged. In other embodiments, the apparatus 200 may further comprise any suitable short range communication solution, such as for example a Bluetooth or Bluetooth Smart wireless connection or a USB/firewire wired connection. In addition, when the NED acts as a display for a mobile device, there may be wired or wireless connection between the NED and the mobile device.

The apparatus 200 may be connected via a fixed network, such as the Internet or a local area network, or a mobile communication network, such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks to other devices. Different networks may be connected to each other by means of a communication interface. The networks comprise network elements, such as routers and switches for processing data (not shown), and communication interfaces, such as the base stations in order to provide access to the network for the different devices, and the base stations may be themselves connected to the mobile network via a fixed connection or a wireless connection.

Figure 3:
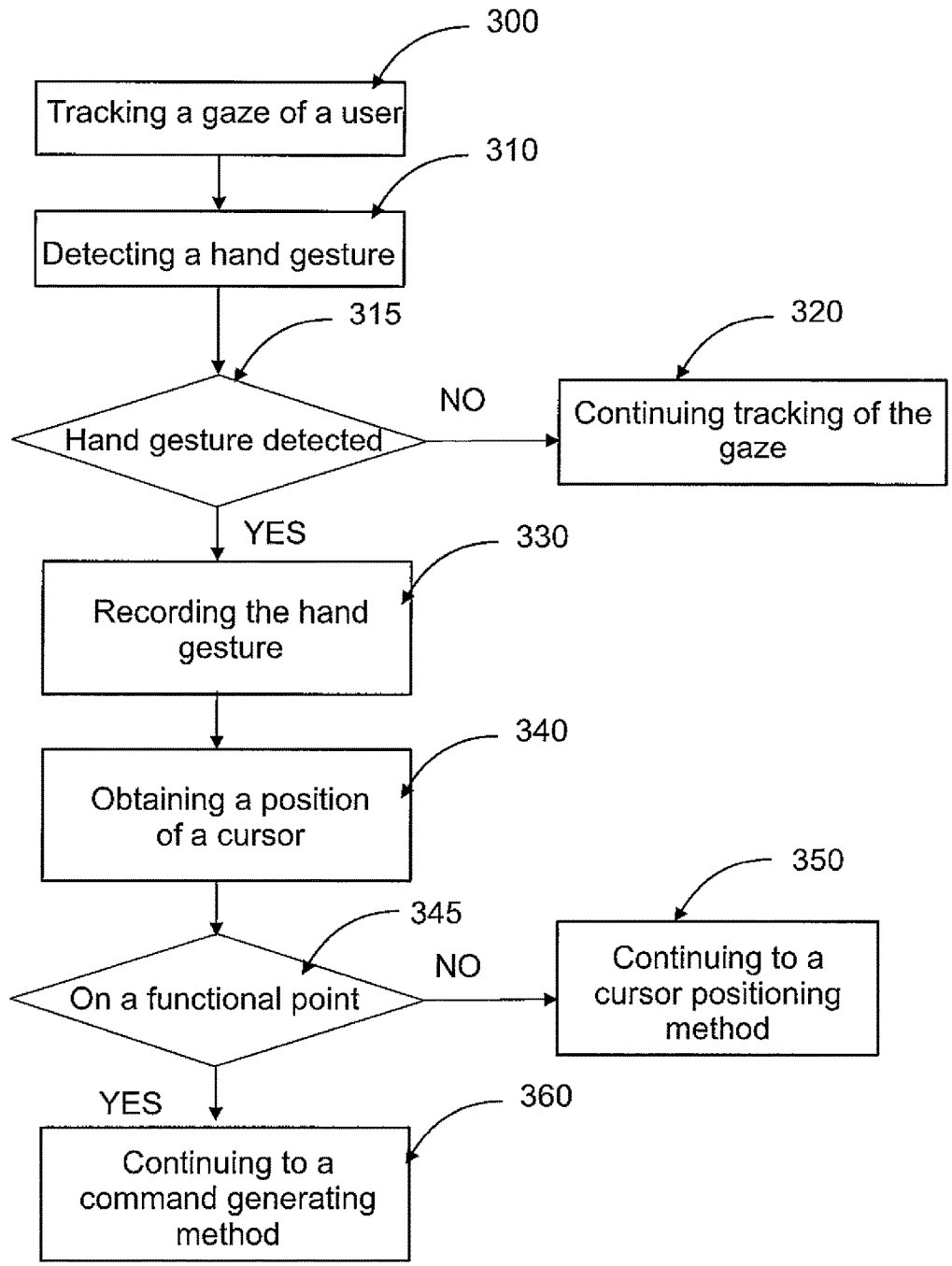
FIG. 3 shows a flow chart of a method for controlling user interface of a NED device according to an embodiment.

FIG. 3 shows a flow chart of a method for controlling the user interface of a NED device according to an embodiment. In step 300, an inside-looking camera, a gaze tracker, tracks a gaze of a user and a gaze tracker software controls a view point on the screen of the NED, so that the cursor position on the screen will mainly refer to the view point. In step 310, hand gestures are observed by a side down-looking camera, a hand gesture detector after the gaze is detected to move only slightly or to stay substantially still. In step 315, it is determined by the hand gesture detector software if a hand gesture is detected i.e. if the hand of the user is moving. If it is determined in step 315 that a hand gesture is not detected, the gaze tracker continues to track the gaze, and the cursor will continue following the view point of the gaze in step 320. However, if it is determined in step 315 that a hand gesture is detected, the hand gesture is recorded into a memory of the NED device in step 330. In step 340, the position of the cursor V(x0, y0) is obtained and recorded by the UI software of NED. In step 345 it is determined if the cursor is on any functional icon, a menu option or any other selectable point. If it is determined in step 345 that the cursor is not on any functional icon or a menu option, the method continues to cursor positioning method in step 350. The cursor positioning method is disclosed in context with FIG. 4. However, if it is determined in step 345 that the cursor is on some functional icon or a menu option, the method continues to a command generating method in step 360. This command generating method is disclosed in context with FIG. 5.

Figure 4:
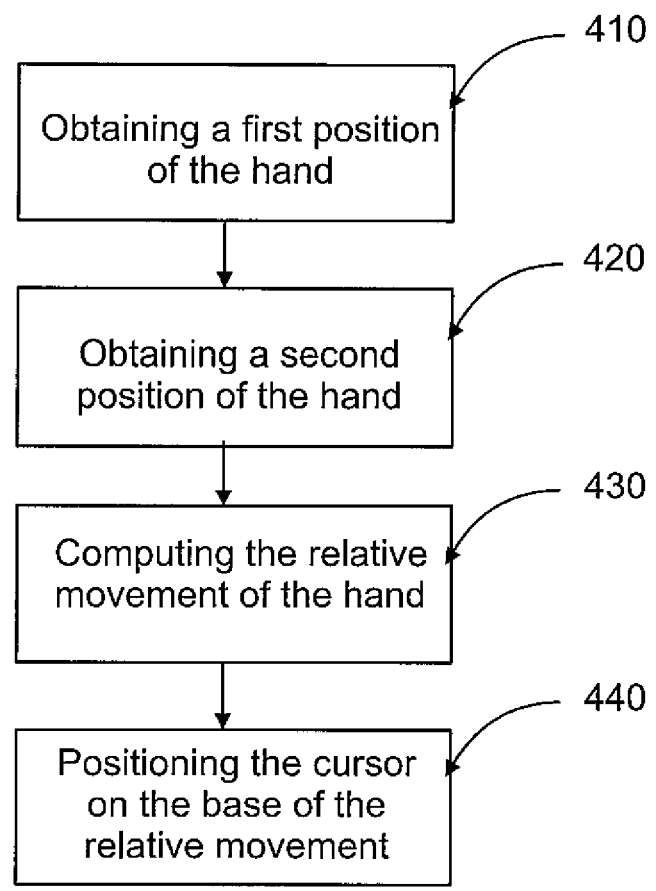
FIG. 4 shows a flow chart of a method for generating a command for controlling the position of a cursor on a screen of a NED device according to an embodiment.

FIG. 4 shows a flow chart on a method for generating a command for controlling the position of a cursor on the screen of a NED device according to an embodiment. In this embodiment, the positioning is performed on the basis of detected hand gesture in a case where the cursor is not overlaid on any functional icon or a menu option; that is, any functional icon or menu option is not selectable at the current position of the cursor. The position of the view point, i.e. the position of the cursor, V(x0, y0) is obtained and recorded in step 340 of FIG. 3 into a memory of the NED device. The detected hand gesture is recorded (step 330 of FIG. 3). In step 410, the first position of a hand palm P(x1, y1) in the hand gesture is obtained and recorded. In step 420, the second position of the hand palm P(x2, y2) in the hand gesture is obtained and recorded. In step 430, that relative movement of that hand palm P(Δx,Δy) in the hand gesture is computed on the base of the first position and second position of the hand palm, Δx=x2−x1 and Δy=y2−y1. In step 440, the cursor is positioned on the screen on the basis of the relative movement of the hand palm P(Δx, Δy). The new position of the cursor is then V(x, y), wherein x=x0+Δx and y=y0+yx. However, it should be noted that Δx and/or Δy may be zero, when the position of the cursor is not changed. Thus, by the hand palm movement, it is possible to move the position of the cursor, when the gaze is tracked to be motionless or it moves only slightly. However, it is also possible to determine a new position for the cursor on the basis of another gesture than the movement of the hand palm, for example, on the basis of the movement of the thumb.

Figure 5:
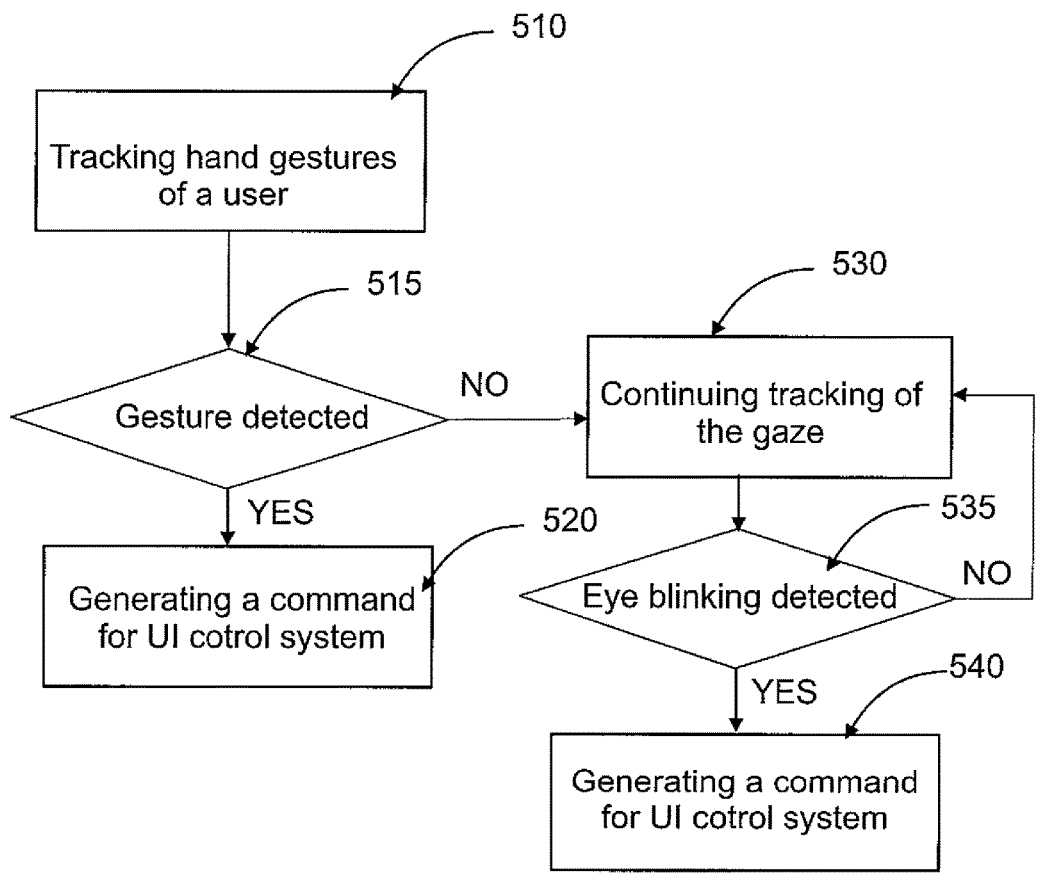
FIG. 5 shows a flow chart of a method for generating a command for controlling the user interface control system of a NED device according to an embodiment.

FIG. 5 shows a flow chart on a method for generating a command for the user interface control system of a NED device according to an embodiment. In this embodiment, the command generation is performed on the basis of a detected hand gesture or eye blinking in a case where the cursor is overlaid on a functional icon or a menu option, that is, any functional icon or menu option is selectable at the current position of the cursor. In step 510, a side down-looking video camera is detecting gestures of the hand. In step 515, it is determined if a hand gesture is detected by the side down-looking camera. If a hand gesture is detected in step 515, the software of the NED creates a selecting/confirmation command in step 520 on the basis of the hand gesture. However, if it is determined in step 515 that no hand gesture is detected, the gaze tracker continues gaze tracking in step 530. In step 535 it is determined if the gaze tracker detects a blink of an eye that exceeds a threshold time. If a blink of an eye is detected by the gaze tracker in step 535, the software of the NED device creates a selecting/confirmation command in step 540. If no blink of the eye is detected by the gaze tracker in step 535, the gaze tracker device may continue to track the gaze. However, it is also possible to activate some other sensor than the gaze tracker in step 530, for example, a microphone, an acceleration sensor or EMG sensor and to create a command for NED device on the basis of their inputs.

Thus, the method controlling the UI system of a near-to-eye device is a multimodal interaction system with the combination of a hand gesture detector and a gaze tracker. Screen cursor positioning and movement can be controlled by gaze tracking as the dominant modality through the inside-looking camera, while the selection/confirmation command is mainly generated by a hand grasping gesture through the side down-looking camera. Before any UI command is generated for applying to the interaction, the system will select the dominant modality for interaction.

In the implementation of this multimodal interaction system, it is important to ensure a reliable hand detector and gaze tracker. An overview of how to use HOG and SVM for hand and gaze tracking will be explained in more detailed below:

The process for hand or gaze may be detached into two separate parts: hand detector training and hand tracking or gaze detector training and gaze tracking.

Hand detector training may comprise: A large scale of hand samples and backgrounds which are collected as training data; HOG is applied on the data to extract features for sample description; and All HOG features are inputted into SVM learner to learn hand detector.

Hand tracking may comprise following steps: For each video frame, pyramid scanning is employed to generate the pool of detection windows within image scale space; and HOG features are extracted from each detection window and then pushed into hand detector to confirm the current detection window is hand or not.

The process for a gaze may work in the same way as the process for a hand. However, in the gaze process there is an additional last step, where the gaze ellipse and two brightest reflection dots are detected within the located gaze region, and then both the gaze ellipse and the two brightest reflection dots are used to position the view point on the NED screen.

In summary, there are two steps in the hand and gaze tracking framework, namely HOG based feature extraction and SVM based classification.

HOG Based Feature Extraction

In hand or gaze tracking, discriminative features are extracted from images to make differentiations between hands or gazes and backgrounds. Different from other feature extraction methods, HOG makes statistics on occurrences of gradient orientation within local image regions so as to be capable of macro edge extraction and upholding invariance to geometric and photometric transformations. Considering that both human hands and gazes have clear contour structures, HOG is adaptive in feature description of them. The method of HOG to extract features from hand or gaze images according to an embodiment is disclosed below: The method may comprise following steps:

Calculate the gradient magnitude and its orientation of each image pixel from a hand or gaze image;

Quantize the gradient orientation into 9 bins with linear interpolation weighted by its gradient magnitude for each pixel;

Divide the image into 12×12 blocks by sliding the block window through the whole image, wherein one block lays an overlaying of half the window size between two adjacent blocks;

Decompose each block into four 6*6 cells and for each cell, compute the orientation histogram with 9 bins, based on the quantized orientation of each pixel inside the cell and the distance between the pixel position and the cell center for forming a HOG feature vector of 36 bins for each block.

Normalize the 36 bin vector with its normal value and concatenating all HOG feature vectors extracted from all image blocks to form the final HOG representation with the dimension of 36*N.

This method for extracting features from hand images mainly employs the mechanism of weighted histogram statistics on local image regions.

SVM Based Classification

To realize reliable hand or gaze tracking in multimodal interaction, it may be advantageous to learn statistical models from a large scale of training samples to differentiate between a hand or gaze object and other background objects. In detail, the learning of hand and gaze detectors based on HOG+SVM may comprise following steps:

Extract HOG features from training comprising hand/non-hand or gaze/non-gaze images as training data;

Select randomly more than 20,000 hand or gaze images as a positive training set, together with more than 40,000 non-hand or non-gaze images as an initial negative set;

A preliminary hand or gaze detector is trained by SVM, and then collect all false alarms from the training set as "hard examples";

The final hand or gaze detector can be derived by applying SVM once more time on the same positive training set and the augmented negative set by incorporating the initial negative set and "hard examples" are established on the motion analysis of hands and gazes, so the performance relies on the reliable hand detection and gaze tracking to make users feel comfortable in user interaction. It is possible to use, for example, Histogram of Oriented Gradient (HOG) and Support Vector Machine (SVM) methods to locate hands and gazes from video streams captured by the cameras mounted on NED.

After the configuration of hand and gaze detectors, real-time hand or gaze detection and tracking become possible by applying them to find precise locations of hands or gazes from video streams as in multimodal interaction with NED. It may employ a standard object detection framework by sliding the detection window through the frame of figure. For each sliding window, HOG features may be extracted from it and then input into learned SVM detectors to confirm whether the current sliding window contains hand or gaze or not.

However, it may also be possible to use the some other methods than HOG and SVM to detect hands and track gazes.

In user interaction through multimodalities, based on the motion analysis of detected eye gazes and hands, the system will select the dominant modality for interaction, for example, for re-positioning the cursor or generating commands. In the multimodal interaction system, if the view point of an eye gaze is moving, the screen cursor will follow the view point and the interaction system detects a hand grabbing gesture. With these operations, it is possible to enable a flexible multimodal interaction environment for NED with UI commands for user.

The various embodiments of the invention can be implemented with the help of a computer program code that resides in a memory and causes the relevant apparatuses to carry out the invention. For example, a NED device may comprise circuitry and electronics for handling, receiving and transmitting data, a computer program code in a memory, and a processor that, when running the computer program code, causes the NED device to carry out the features of an embodiment. Yet further, a network device may comprise circuitry and electronics for handling, receiving and transmitting data, a computer program code in a memory, and a processor that, when running the computer program code, causes the network device to carry out the features of an embodiment.

It is obvious that the present invention is not limited solely to the above-presented embodiments, but it can be modified within the scope of the appended claims.

What is claimed is:

1. A method, comprising:
    tracking a gaze of an eye of a user by an inside-looking camera of a near-to-eye display, wherein a position of the gaze determines a place for a cursor on the screen of the near-to-eye display, wherein the movement of the gaze is configured to move the cursor on the screen of the near-to-eye display and when the movement of the gaze is detected to be still or moving only slightly,
    obtaining a first position of a hand of the user by a side down-looking camera of the near-to-eye display,
    obtaining a second position of the hand of the user by the side down-looking camera of the near-to-eye display,
    computing relative movement of the hand based on the first and second positions of the hand,
    positioning the cursor on the basis of the relative movement of the hand,
    in an instance at least one gesture of the hand is detected by the side down-looking camera, activating a manual control of the user interface by adjusting the position of the cursor on the screen of the near-to-eye display;
    adjusting the position of the cursor on the screen of the near-to-eye display on a basis of further relative movement of the hand in an instance in which the cursor is outside an area of a menu option or a functional icon displayed on the screen; and
    in an instance at least one gesture is no longer detected by the side down-looking camera, resuming a gaze control of the user interface.

2. The method of claim 1, wherein the further operation depends on the detected gesture.

3. The method of claim 1, wherein the detected gesture is a movement of a fist, shaking of a palm or movement of a palm from or to the second camera.

4. The method of claim 1, wherein the further operation further depends on the position of the cursor on the screen of the near-to-eye display.

5. The method of claim 1, wherein the further operation is:
    selecting a menu option or a functional icon displayed on the screen of the near-to-eye display if the cursor is on the menu option or functional icon.

6. The method of claim 1, wherein the further operation is:
    zooming in or out the view of the screen of the near-to-eye display.

7. The method of claim 1, wherein the further operation is:
    returning, removing or deleting.

8. The method of claim 1, further comprising:
    observing blinking of the eye of the user if no gesture of the hand is detected and if the cursor is on the area of a menu option or a functional icon displayed on the screen, and
    selecting the menu option or the functional icon if blinking of the eye of the user is detected.

9. An apparatus comprising at least one processor, and at least one memory including a computer program code, said at least one memory and the computer program code being configured, with the processor, to cause the apparatus to perform at least the following:
    track a gaze of one eye of a user by an inside-looking camera of a near-to-eye display, wherein a position of the gaze determines a place for a cursor on a screen of the near-to-eye display of the apparatus, wherein a movement of the gaze is configured to move the cursor on the screen of the near-to-eye display and when the movement of the gaze is detected to be still or moving only slightly,
    obtain a first position of a hand of the user by a side down-looking camera of the near-to-eye display,
    obtain a second position of the hand of the user by the side down-looking camera of the near-to-eye display,
    compute relative movement of the hand based on the first and second positions of the hand,
    position the cursor on the basis of the relative movement of the hand,
    in an instance at least one gesture of the hand is detected by the side down-looking camera, activate a manual control of the user interface by adjusting the position of the cursor on the screen of the near-to-eye display;
    adjust the position of the cursor on the screen of the near-to-eye display on a basis of further relative movement of the hand in an instance in which the cursor is outside an area of a menu option or a functional icon displayed on the screen; and
    in an instance that the at least one gesture is no longer detected by the side down-looking camera, resume a gaze control of the user interface.

10. The apparatus of claim 9, wherein the further operation depends on the detected gesture.

11. The apparatus of claim 9, wherein the detected gesture may be the movement of a fist, the shaking of a palm and the movement of a palm from or to the second camera.

12. The apparatus of claim 9, wherein the further operation further depends on the position of the cursor on the screen of the near-to-eye display.

13. The apparatus of claim 9, wherein the further operation is:
    select a menu option or a functional icon displayed on the screen of the near-to-eye display if the cursor is on the menu option or functional icon.

14. The apparatus of claim 9, wherein the further operation is:

zoom in or out the view of the screen of the near-to-eye display.

15. The apparatus of claim 9, wherein the further operation is:
return, remove or delete.

16. The apparatus of claim 9, wherein the computer program code is further configured, with the processor, to cause the apparatus to perform:
observe blinking of the eye of the user if no gesture of the hand is detected and if the cursor is on the area of a menu option or a functional icon displayed on the screen, and
select the menu option or functional icon of the cursor on the screen of the near-to-eye display if blinking of the eye of the user is detected.

17. The apparatus of claim 9, wherein said apparatus is a near-to-eye display device.

18. The apparatus of claim 17, wherein said near-to-eye display device is a terminal device for a mobile phone.

* * * * *